US008290295B2

(12) United States Patent
Criminisi et al.

(10) Patent No.: US 8,290,295 B2
(45) Date of Patent: Oct. 16, 2012

(54) MULTI-MODAL TONE-MAPPING OF IMAGES

(75) Inventors: Antonio Criminisi, Cambridge (GB); Evgeny Salnikov, Redmond, WA (US); Toby Sharp, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 897 days.

(21) Appl. No.: 12/396,590

(22) Filed: Mar. 3, 2009

(65) Prior Publication Data

US 2010/0226547 A1 Sep. 9, 2010

(51) Int. Cl.
*G06K 9/38* (2006.01)
(52) U.S. Cl. ........................................ 382/274; 382/132
(58) Field of Classification Search .................. None
See application file for complete search history.

(56) References Cited

U.S. PATENT DOCUMENTS

| | | | | |
|---|---|---|---|---|
| 4,302,672 | A * | 11/1981 | Kato et al. | 250/582 |
| 4,792,979 | A * | 12/1988 | Nomura et al. | 382/169 |
| 5,357,549 | A * | 10/1994 | Maack et al. | 378/62 |
| 6,017,309 | A * | 1/2000 | Washburn et al. | 600/454 |
| 6,091,853 | A * | 7/2000 | Otto | 382/232 |
| 6,243,441 | B1 * | 6/2001 | Zur | 378/98.8 |
| 6,463,173 | B1 * | 10/2002 | Tretter | 382/168 |
| 6,850,642 | B1 | 2/2005 | Wang | |
| 7,158,686 | B2 | 1/2007 | Gindele | |
| 7,283,654 | B2 | 10/2007 | McLain | |
| 7,302,110 | B2 | 11/2007 | Chesnokov | |
| 8,081,208 | B2 * | 12/2011 | Inomata et al. | 348/80 |
| 8,085,852 | B2 * | 12/2011 | Liu et al. | 375/240.25 |
| 8,150,202 | B2 * | 4/2012 | Mohanty et al. | 382/274 |
| 2002/0171852 | A1 | 11/2002 | Zhang et al. | |
| 2004/0125999 | A1 * | 7/2004 | Iordache et al. | 382/132 |
| 2004/0213457 | A1 * | 10/2004 | Mori | 382/167 |
| 2004/0218830 | A1 | 11/2004 | Kang et al. | |

(Continued)

FOREIGN PATENT DOCUMENTS

WO WO9637072 A1 11/1996

OTHER PUBLICATIONS

A Multidimensional Histogram Equalization by Fitting an Isotropic Gaussian Mixture to a Uniform Distribution; Image Processing, 2006 IEEE International Conference on Oct. 8-11, 2006 Taemin Kim, Yang, H.S. pp. 2865-2868.*

(Continued)

*Primary Examiner* — Wesley Tucker
*Assistant Examiner* — Sean Motsinger
(74) *Attorney, Agent, or Firm* — Lee & Hayes, PLLC

(57) ABSTRACT

A system for multi-modal mapping of images is described. Embodiments are described where the image mapping system is used for visualizing high dynamic range images such as medical images, satellite images, high dynamic range photographs and the like and also for compressing such images. In examples, high bit-depth images are tone-mapped for display on equipment of lower bit-depth without loss of detail. In embodiments, the image mapping system computes statistics describing an input image and fits a multi-modal model to those statistics efficiently. In embodiments, the multi-modal model is a Gaussian mixture model and a plurality of sigmoid functions corresponding to the multi-modal model are obtained. In an embodiment the sigmoid functions are added to form a tone-mapping function which is used to transform a high bit-depth image such as 16 or 12 bits per pixel to a low bit-depth image such as 8 bits per pixel.

18 Claims, 9 Drawing Sheets

U.S. PATENT DOCUMENTS

| | | | |
|---|---|---|---|
| 2007/0025603 A1* | 2/2007 | Dewaele et al. | 382/128 |
| 2007/0183677 A1 | 8/2007 | Aguilar | |
| 2007/0201560 A1* | 8/2007 | Segall et al. | 375/240.24 |
| 2008/0086283 A1* | 4/2008 | Yuan et al. | 702/181 |
| 2008/0226148 A1* | 9/2008 | Gu et al. | 382/128 |
| 2010/0014738 A1* | 1/2010 | Birnholz et al. | 382/131 |
| 2011/0123133 A1* | 5/2011 | Mohanty et al. | 382/274 |

OTHER PUBLICATIONS

Lee et al "The estimating Optimal number of Gaussian mixtures based on incremental K-means for speaker Identification" International Journal of Information Technology vol. 12 No. 7 2006.*

Ghosh, et al., "Volume Rendering for High Dynamic Range Displays", retrieved on Dec. 29, 2008 at <<http://www.cs.uhc.ca/~mmt/Papers/VolumeGraphics.2005-HDR_Vol_Ren.pdf>>, University of British Columbia, 8 pages.

"Iridix: Adaptive, Pixel-by-Pixel Image Processing", retrieved on Dec. 29, 2008 at <<http://www.apical-imaging.com/UserFiles/Apical%20iridix%20overview%20_images_.pdf>>, Apical Limited, Jan. 4, 2006, pp. 1-5.

"Madena 16-bit Window & Level", retrieved on Dec. 29, 2008 at <<http://www.eyephysics.com/Madena/MadenaDICOM.html>>, 6 pages.

PCT International Search Report dated Sep. 27, 2010 for corresponding PCT International Application No. PCT/US2010/025677 filed Feb. 26, 2010, 4 pages.

* cited by examiner

MULTI-MODAL TONE-MAPPING OF IMAGES

BACKGROUND

Image mapping is carried out for many purposes such as image compression, contrast enhancement, and for enabling images captured with capture devices of particular types to be displayed using display devices of different capabilities. For example, in the field of medical imaging (or in other fields such as professional photography, robotic imaging systems, high dynamic range photography, depth cameras, capture devices often produce 16-bit images where for example, each pixel may be one of 65,536 levels of grey (in the case of a greyscale image). Other image capture devices may produce 12-bit images or 32-bit images depending on the image capture device. The term "bit-depth" is used to refer to the number of bits available per pixel at an image capture or display device.

Where images have been captured with high bit-depth devices it is often required to reduce the bit-depth to enable the captured images to be displayed on a display device with lower bit-depth. This is difficult to achieve whilst preserving as much information as possible, so as not to lose the original dynamic range captured in the high bit-depth device. This is important for many types of images and particularly so in the field of medical imaging, where images often have particularly high dynamic range and where it is required to visualize fine details in images and remove noise as far as possible in order to make accurate medical diagnoses.

Dynamic range of an image may be thought of as the ratio between the intensities of the brightest and darkest recordable parts of that image. Tone-mapping functions are typically used to compress the dynamic range of an image to allow more detail in the original image to be visualized on a display whilst preferably preserving the "natural look" of the image. Improved tone-mapping systems are required which may produce more realistic, useful results in a computationally inexpensive, fast and robust manner.

Where images are captured at devices with relatively high bit-depth, it is often required to compress those captured images to reduce their size for storage and/or transmission. Image compression is difficult to achieve in a manner which is computationally inexpensive, fast, which does not produce visible artefacts and which is reversible (that is, the original image can be obtained from the compressed image without loss of quality).

Previous approaches for mapping images of one bit-depth to another bit-depth have included histogram equalization, linear mappings and gamma mappings. Linear mappings and gamma mappings are straightforward techniques but which are also very limited in the quality of results they give.

Histogram equalization tone-mapping processes typically involve taking the cumulative histogram of an image to be tone-mapped. The cumulative histogram is then normalized to 255 (in the case that the output bit-depth is 8 bits) and the normalized cumulative histogram is then used as a mapping function to transform the original image to the required bit-depth. However, histogram equalization processes are often found to be very aggressive and as a result fine details in images are lost. Artefacts may also be introduced such as gradient reversal and quantization or banding artefacts.

Local histogram equalization tone-mapping processes are also known. These are sometimes referred to as adaptive histogram equalizing techniques. They involve applying different transforms to equalize the histograms of sub-regions of an image. These approaches are typically highly computationally intensive and difficult to implement in real-time applications. Noise and artefacts may also be introduced for example, because a rectangular window is typically used around each pixel for histogram equalization in this window. The resulting transform is then not spatially smooth.

Previously, a single sigmoid function has been used as a tone-mapping function, with the sigmoid function determined from original image statistics and taking perceptual preference guidelines into account. Taking subjective preferences into account allows the image to look as pleasing as possible to the viewer. This is desirable in consumer imaging and commercial photography. However, this approach is not suitable for medical imaging applications, satellite imaging, archiving and the like where the goal is information preservation. In such cases it is required to preserve or enhance details at all regions and luminance levels of an image, not just those suited to the human visual system.

The embodiments described below are not limited to implementations which solve any or all of the noted disadvantages of known image mapping systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A system for multi-modal mapping of images is described. Embodiments are described where the image mapping system is used for visualizing high dynamic range images such as medical images, satellite images, high dynamic range photographs and the like and also for compressing such images. In examples, high bit-depth images are tone-mapped for display on equipment of lower bit-depth without loss of detail. In embodiments, the image mapping system computes statistics describing an input image and fits a multi-modal model to those statistics efficiently. In embodiments, the multi-modal model is a Gaussian mixture model and a plurality of sigmoid functions corresponding to the multi-modal model are obtained. In an embodiment the sigmoid functions are added to form a tone-mapping function which is used to transform a high bit-depth image such as 16 or 12 bits per pixel to a low bit-depth image such as 8 bits per pixel.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4b is a schematic diagram of a tone-mapping function formed using the Gaussian mixture model of FIG. 4a;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a medical imaging system, the system described is provided as an example and not a limitation. As those skilled in the art will appreciate, the present examples are suitable for application in a variety of different types of imaging systems.

Figure 1A:
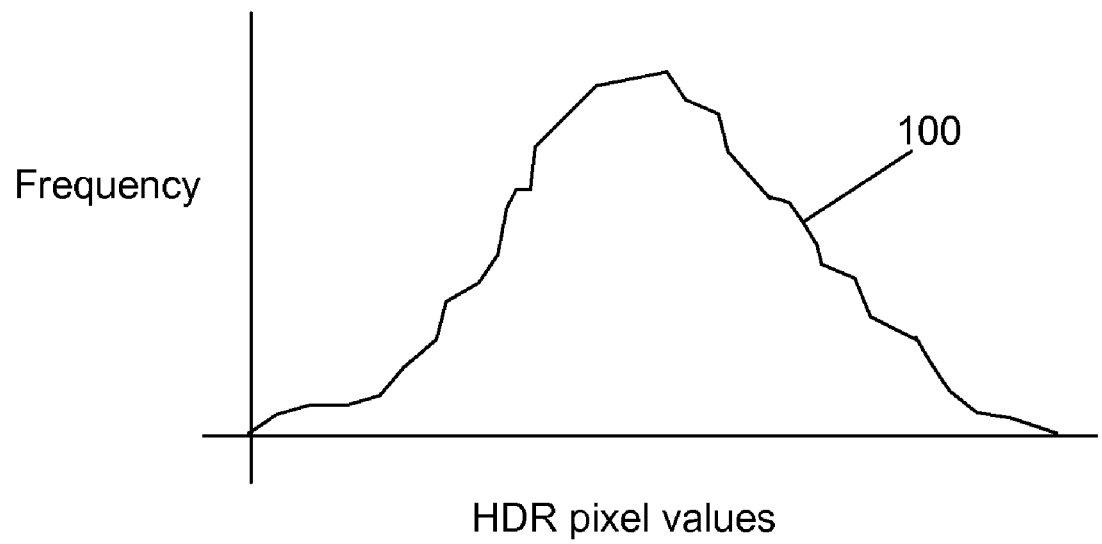
FIG. 1a is a schematic diagram of a cumulative histogram of a high dynamic range image.
Figure 1B:
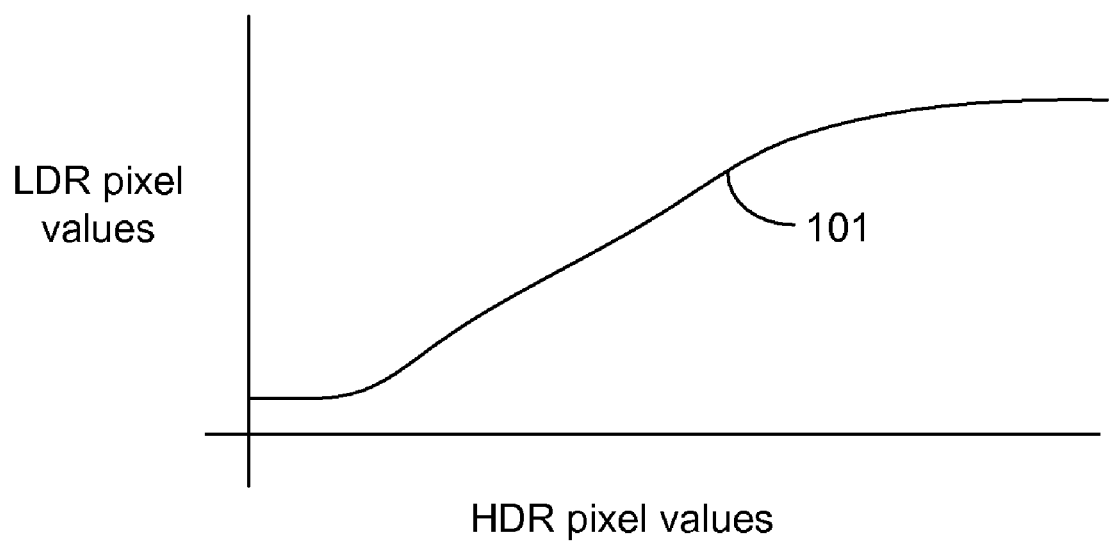
FIG. 1b is a schematic diagram of a sigmoid tone mapping function.

FIG. 1a is a schematic diagram of a cumulative histogram 100 of a high dynamic range image. FIG. 1b is a schematic diagram of a single sigmoid function 101 which may be used as a tone-mapping function for the image which produced the histogram of FIG. 1a. For a given pixel in the high dynamic range input image, the intensity value is used to look-up the corresponding low dynamic range pixel value using the sigmoid function. This process is satisfactory in the case that the cumulative histogram of the input image is uni-modal as in the example of FIG. 1a. However, this is not the case for many types of high dynamic range images such as medical images, satellite images, dental images, high dynamic range photographs and other images of scenes or items where there are many distinct ranges of pixel intensities. This is explained in more detail with reference to FIG. 2.

Figure 2:
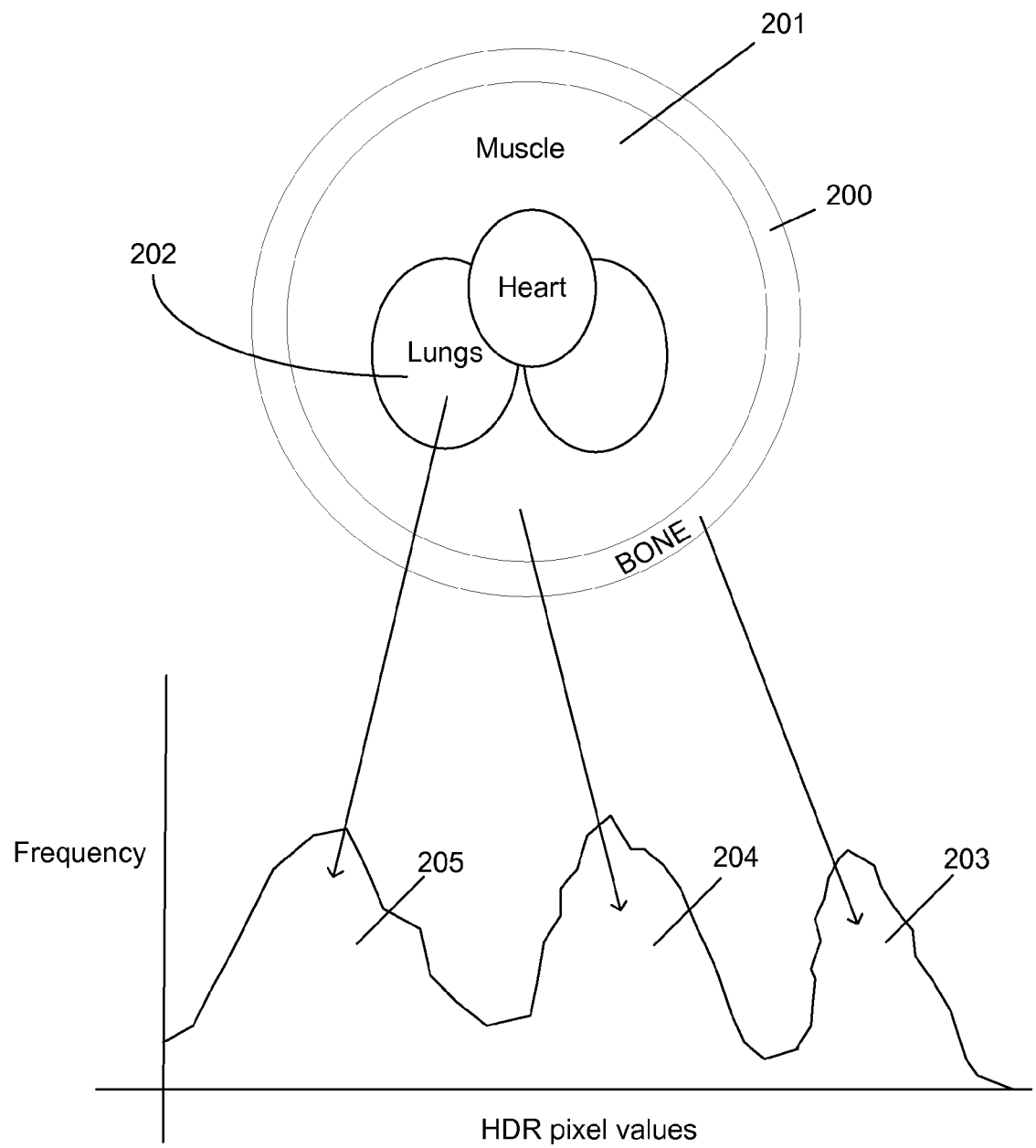
FIG. 2 is a schematic diagram of a computational tomography (CT) scan image and an associated cumulative histogram of that scan image which is multi-modal.
Figure 3:
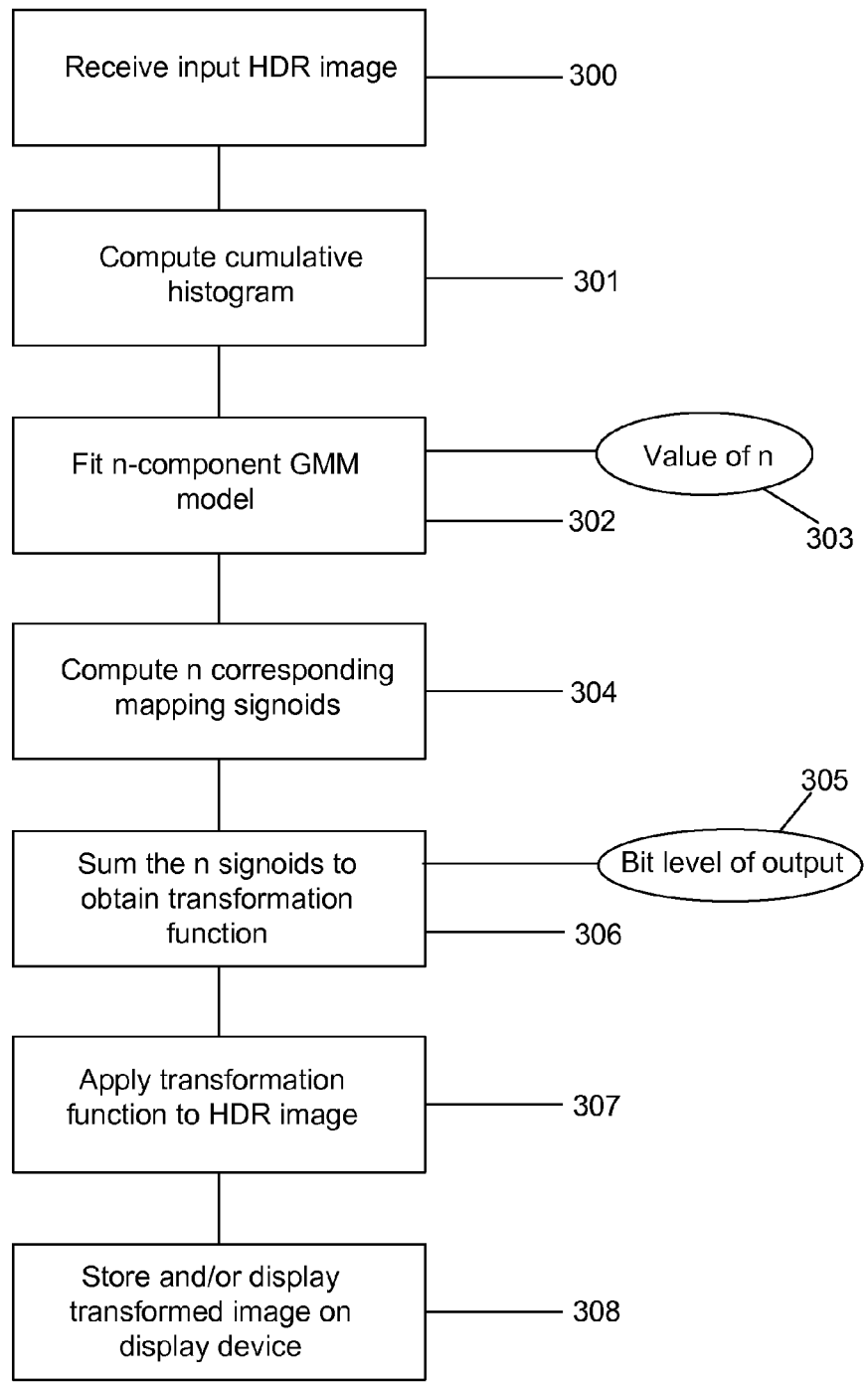
FIG. 3 is a flow diagram of a method of image mapping.

FIG. 2 shows a schematic diagram of a CT scan and an associated cumulative image histogram. The CT scan is of a human body comprising muscle 201, bone 200 and lungs 202. The parts of the image representing bone tend to have pixel intensities in a high range 203 as shown in the histogram. The parts of the image representing muscle tend to produce pixel intensities in a different range 204 and the parts of the image representing lungs 205 produce pixel intensities in yet another range 205. These three different ranges in the histogram are not adequately taken into account by a single sigmoid tone-mapping function such as that of FIG. 1b. If such a tone-mapping function is used the results are poor because much of the detail of the lungs and bone regions are lost. This is problematic for applications where information preservation is key such as for medical diagnosis.

To address such problems the embodiments described herein use a multi-modal model which is able to take into account more than one mode in the cumulative histogram of the input image. Multi-modal models are more complex than single mode models (such as that of FIG. 1b) and yet the embodiments described herein provide an image mapping system which may be used in real time for practical applications such as in hospitals, dental surgeries, weather forecasting systems and the like.

FIG. 2 is a flow diagram of a method of image mapping. An input digital image is received 300 which is a high dynamic range image of any type. A cumulative histogram is computed of the input image 301. For example, for a grey scale image a histogram generator determines a bin size (e.g. a range of values such as 0-10, 11-20, 21-30, etc.) and counts the number of occurrences of pixel grey scale values in each bin. A graph of the bins against the frequency of occurrence in each bin gives a graphical representation of the histogram such as that illustrated in FIG. 2.

A processor is arranged to fit 302 a multi-modal model to the histogram. Any suitable type of multi-modal model may be used such as a Gaussian mixture model (GMM). The number of modes (n) that are required may be a configurable parameter 303 or may be determined automatically by the image mapping system. For many practical applications, including CT scans and MRI (magnetic resonance imaging) scans it is found that using only two modes provides greatly improved results as compared with previous tone-mapping processes and that increasing the number of modes to three or more is advantageous in some cases.

Figure 5:
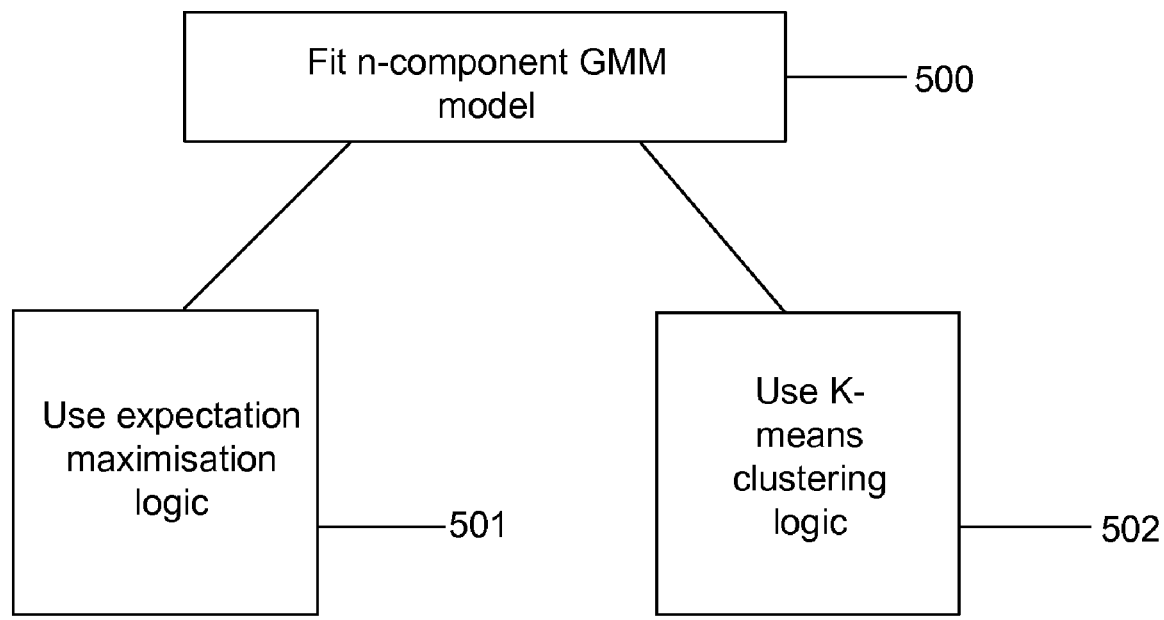
FIG. 5 is a flow diagram of a method of determining a Gaussian mixture model.

In an embodiment, an n-component GMM model is fitted to the histogram. Various different methods of computing the GMM model are possible as discussed below with reference to FIG. 5. GMM models are described in detail in Bishop. C. M Pattern Recognition and Machine Learning. 2006 Springer which is incorporated herein by reference in its entirety.

Using the Gaussian mixture model n corresponding mapping sigmoid functions are computed 304 and summed 306 to obtain a multi-modal tone-mapping function (also called transformation function). The bit-depth of the output display 305 may be taken into account. This is described in more detail below with reference to FIG. 4.

Once the tone-mapping function is obtained it is used to transform 307 the high dynamic range input image into an output image with the required bit-depth. The output image is stored or displayed on a display device such as a computer screen or printer 308.

Figure 4A:
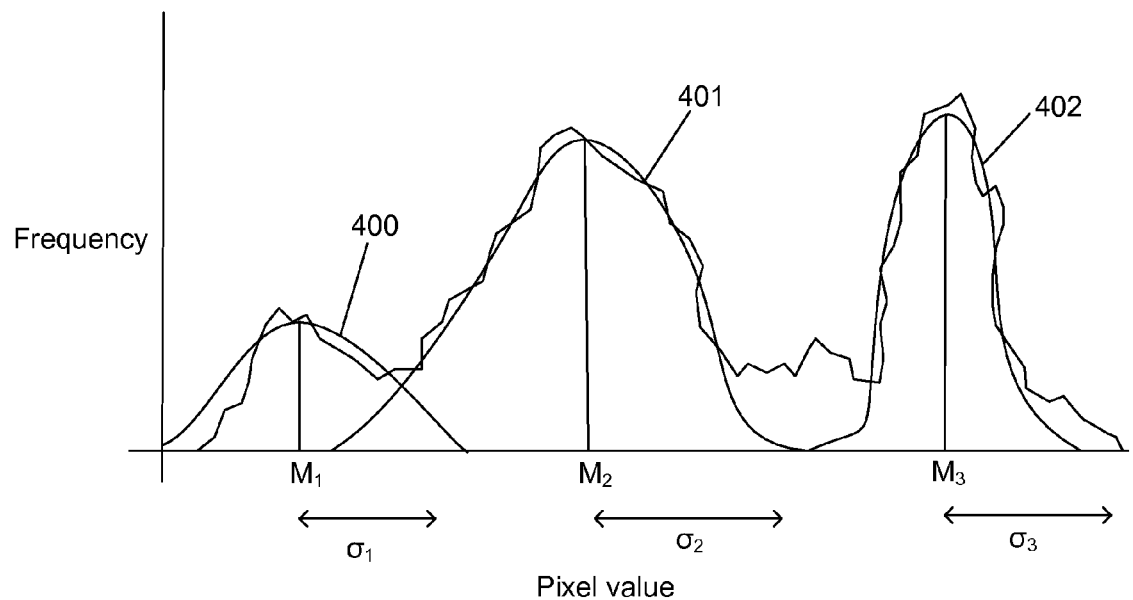
FIG. 4a is a schematic diagram of a cumulative histogram of a high dynamic range image and showing a schematic Gaussian mixture model superimposed on the histogram.
Figure 4B:
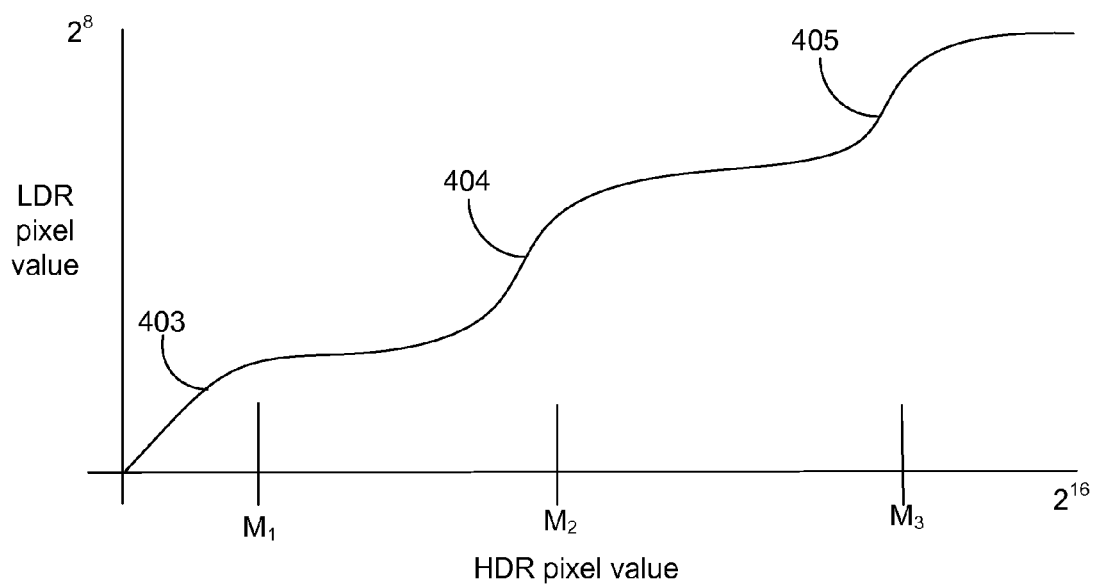

FIG. 4a is a schematic diagram of a cumulative histogram of a high dynamic range image. The histogram is multi-modal and a GMM model is fitted with 3 components represented by Gaussian distributions 400, 401 and 402. Each Gaussian distribution has an associated mean p and standard deviation sigma. The parameters of the Gaussian distributions are used as known in the art to form a sigmoid function corresponding to each Gaussian distribution. These sigmoid functions 403, 404, 405 are added to form a tone-mapping function as illustrated in FIG. 4b. The resulting tone-mapping function may be adjusted if necessary to ensure that it begins at the origin in order that black pixels from the HDR image map to black pixels in the output image. This ensures that the full range of available bit-depth in the output is made use of.

The step of fitting the multi-modal model is relatively complex compared with other stages of the process and compared with previous approaches which have used uni-modal models. Various different methods of fitting the multi-modal model may be used. For example, an n-component GMM model 500 may be fitted using an expectation maximization logic provided in the image mapping system. Expectation maximization is explained in detail in Bishop. C. M Pattern Recognition and Machine Learning. 2006 Springer reference above. Another approach is to use a K-means clustering logic provided in the image mapping system. K-means clustering is also explained in detail in Bishop. C. M Pattern Recognition and Machine Learning. 2006 Springer which is referenced above. In order to provide a particularly fast implementation, an embodiment uses 1D K-means clustering in an efficient manner. In this embodiment image data to be processed is received in the form of integer values. For non-integer values these are first quantized and then treated as integers. The minimum and maximum values in the integer data set are determined and a histogram of the integer values is created. Cluster center positions are initialized to be equally spaced throughout the range of values. The following steps are then performed iteratively until convergence:

For each of K clusters the 1D Voronoi interval is determined around the current center position. For each histogram entry in the current interval, the number of values in that cluster are accumulated and the sum of those values is determined. After going through the whole interval the cluster's center of mass is re-computed as the sum divided by the count. If the procedure produces de minimis change in the cluster center positions then the procedure is terminated.

In some embodiments the image mapping process is dynamic in that the tone-mapping function is re-computed in real time for sub-regions of the input image, for example, as a result of user input "zooming in" on a particular part of the image. This is useful in many data visualization applications such as medical imaging where a medical doctor may need to see more detail in a particular region of an image in order to make a diagnosis. The sub-region of the image may be specified by user input, such as via a graphical user interface, speech interface or other interface. Alternatively, the sub-region may be selected automatically by an image processing system.

Figure 6:
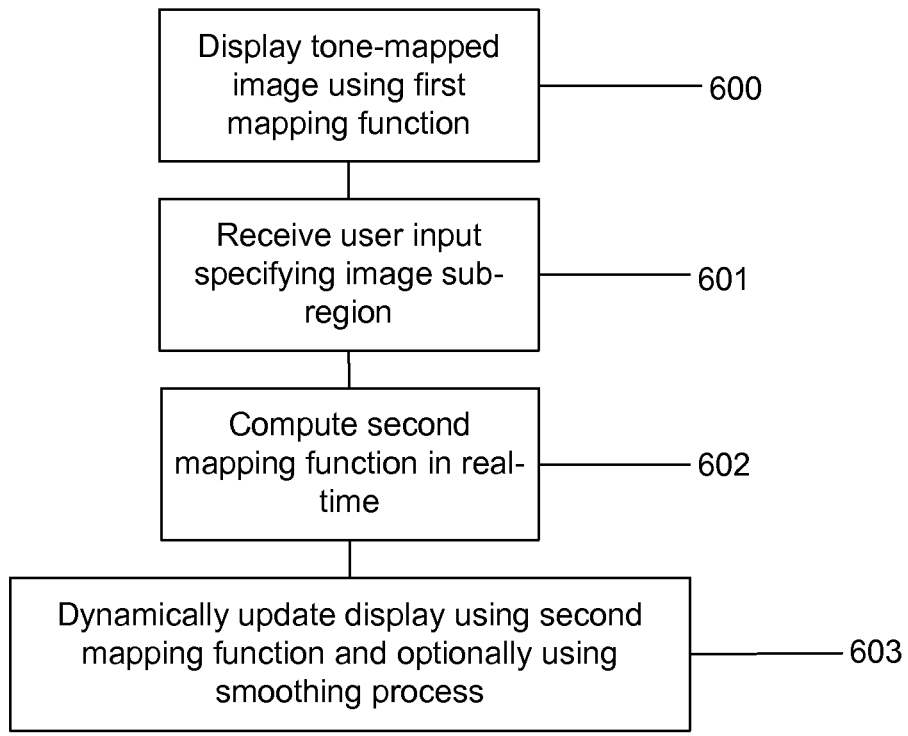
FIG. 6 is a flow diagram of a method of dynamically tone-mapping sub-regions of an image.
Figure 7A:
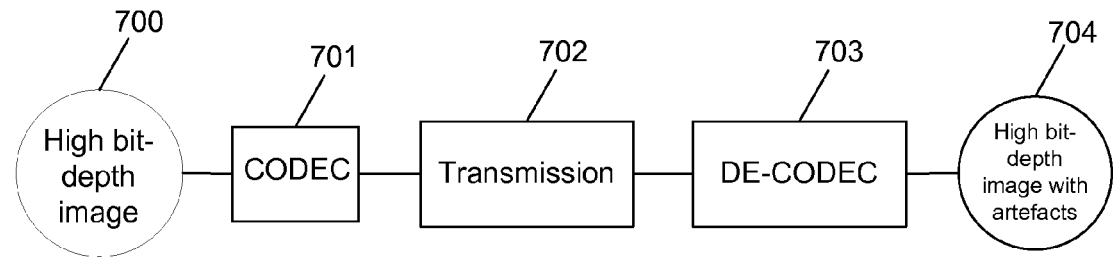
FIG. 7a is a schematic diagram of apparatus arranged to compress, transmit and decompress a high bit-depth image.
Figure 7B:
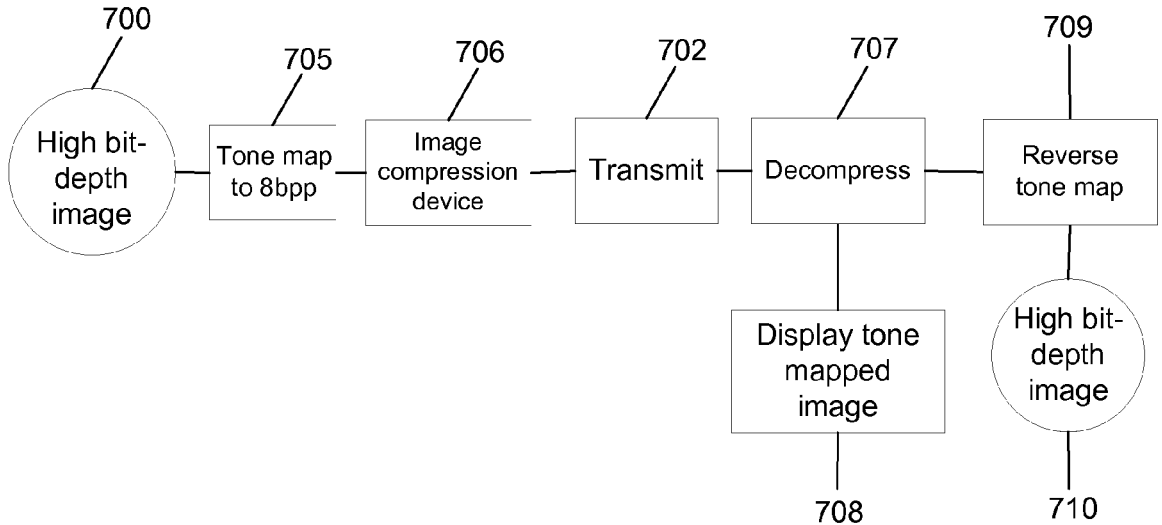
FIG. 7b is a schematic diagram of another apparatus arranged to compress, transmit and decompress a high bit-depth image.

For example as described with reference to FIG. 6, a tone-mapped image is obtained using a first mapping function (which is multi-modal) 600 and displayed. User input is received specifying a sub-region of the image 601 and a second mapping function is computed in real-time 602. For example, the n-component GMM model is fitted to a cumulative histogram obtained from the image sub-region. The display is then dynamically updated using the second mapping function 603 and optionally using a smoothing process to avoid an abrupt change in the display. For example, the second mapping function is applied to the image sub-region and only the transformed sub-region displayed.

The processes described herein may also be used to enhance image compression. For example, previously a high bit-depth image 700 has been compressed with a codec 701 suitable for high bit-depth images. Known compression algorithms for high bit-depth images are complex and time consuming. Often these introduce artifacts to the image. Once compressed the image is transmitted 702 for example, over the Internet or other communications network before being uncompressed at a DE-CODEC 703. The resulting high bit-depth image 704 typically contains artifacts.

In an embodiment a high bit depth image 700 is tone mapped to a lower bit depth (such as 8 bits per pixel (bpp)) 705 using any of the embodiments described herein. The tone-mapped image is then compressed 706 using any suitable known 8-bpp image compression algorithm. This results in a higher quality compressed image because the 8 bpp range is utilized optimally thanks to the non-linear tone-mapping. Furthermore, existing 8-bpp compression algorithms are considerably faster than corresponding 16-bpp ones. The compressed image is transmitted 702 and decompressed 707 using the known compression process and may then be displayed 708. For example, in the case of a medical image, a doctor may receive an email with the attached compressed image, decompress that image and display it at his or her PC. The doctor is then able to visualize the tone-mapped image with the same quality as the tone-mapped image before sending. It is also possible to reverse the tone-mapping process 709 to obtain a high-dynamic range image back. In this case, the transmission comprises both the compressed image and the parameters of the multi-modal model. These are used to reverse the tone-mapping process 709 and provide the high bit-depth image without artifacts as would have previously been introduced. That high bit-depth image may then be used for further processing or other purposes as required.

Figure 8:
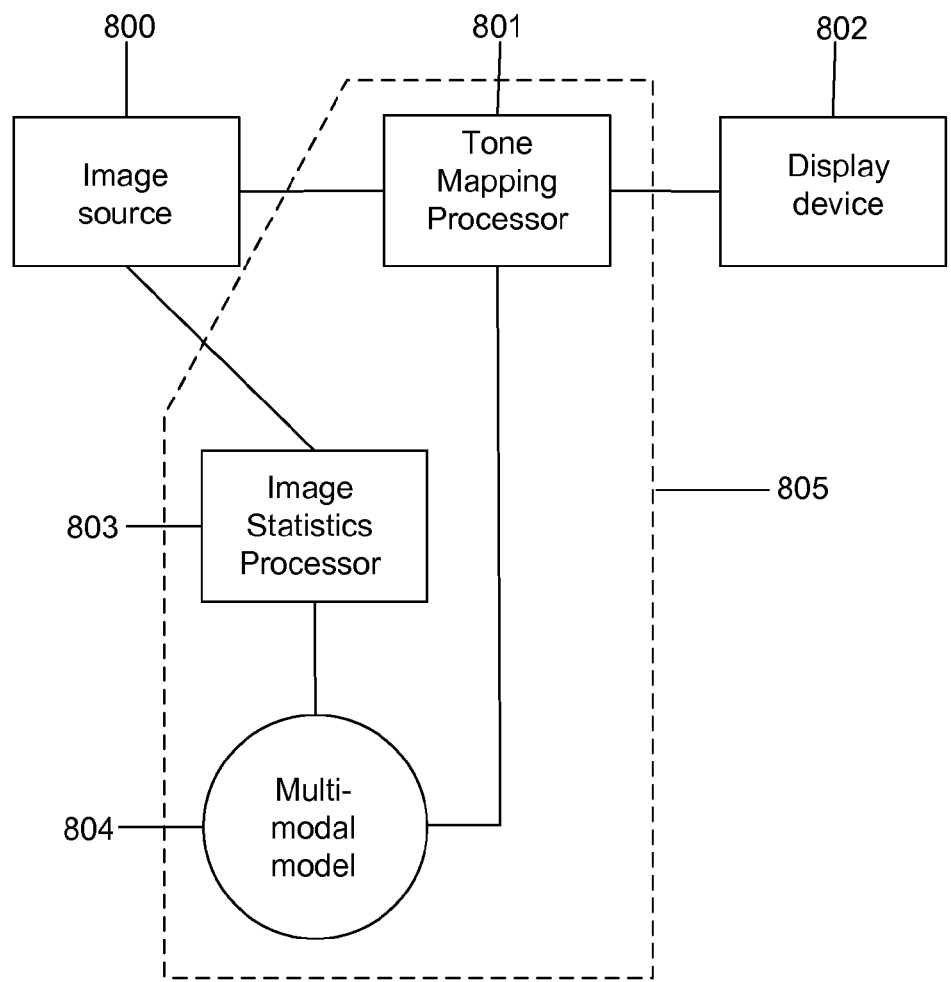
FIG. 8 is a schematic diagram of an image mapping apparatus.

FIG. 8 is a schematic diagram of an image mapping apparatus 805 comprising a tone mapping processor 801 arranged to use a multi-modal model such as those described herein to map a source image 800 of high bit-depth to a display device 802 of lower bit-depth. The display device may be a printer, display screen or other display apparatus. The image mapping apparatus 805 also comprises an image statistics processor 803 which determined statistics describing the source image 800 for use in creating a multi-modal model. The image statistics processor is arranged to fit a multi-modal model to the image statistics and to store the resulting model 804 in memory.

Figure 9:
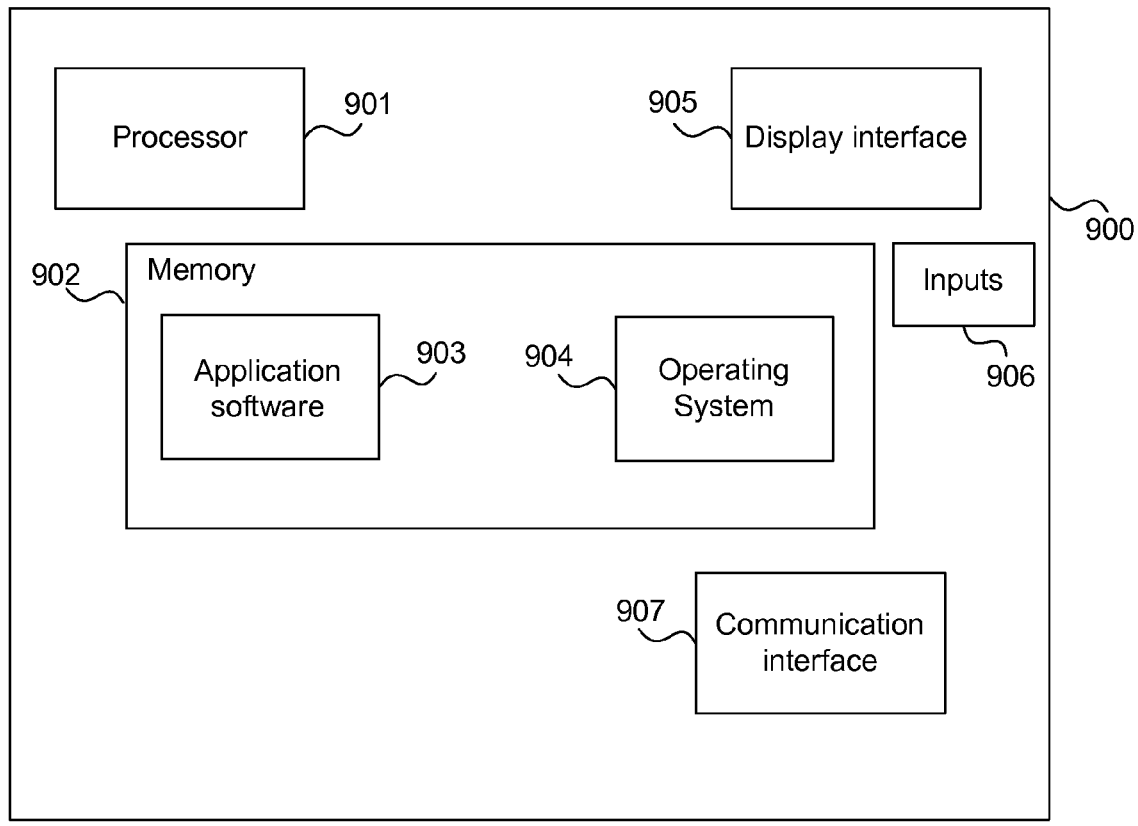
FIG. 9 illustrates an exemplary computing-based device in which embodiments of an image mapping system may be implemented.

FIG. 9 illustrates various components of an exemplary computing-based device 900 which may be implemented as any form of a computing and/or electronic device, and in which embodiments of an image mapping system may be implemented.

The computing-based device 900 comprises one or more inputs 906 which are of any suitable type for receiving media content, Internet Protocol (IP) input, high dynamic range images, high bit-depth images and other input. The device also comprises communication interface 907 for example to connect the device to the Internet or other communications network for transmission of images and/or other data.

Computing-based device 900 also comprises one or more processors 901 which may be microprocessors, controllers or any other suitable type of processors for processing computing executable instructions to control the operation of the device in order to map high bit-depth images to lower bit-depth images whilst retaining dynamic range information. Platform software comprising an operating system 904 or any other suitable platform software may be provided at the computing-based device to enable application software 903 to be executed on the device.

The computer executable instructions may be provided using any computer-readable media, such as memory 902. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 905 may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An image mapping system comprising:
    an input arranged to receive at least part of an input image of a first bit-depth;
    a processor arranged to compute statistics describing the input image and to fit a multi-modal model to the statistics; the processor also being arranged to determine a multi-modal tone-mapping function by determining a plurality of sigmoid functions, one for each mode of the multi-modal model; and
    a tone-mapping processor arranged to apply the tone-mapping function to the received input image to form an output image of bit-depth different from the input image.

2. An image mapping system as claimed in claim 1 wherein the processor is arranged to compute a cumulative histogram of the input image.

3. An image mapping system as claimed in claim 2 wherein the processor is arranged to fit an n-component Gaussian mixture model to the cumulative histogram.

4. An image mapping system as claimed in claim 1 wherein the processor is arranged to determine the tone-mapping function by adding the plurality of sigmoid functions.

5. An image mapping system as claimed in claim 1 wherein the processor is arranged to fit the multi-modal model using a K-means clustering process.

6. An image mapping system as claimed in claim 1 wherein the input is further arranged to receive details of a sub-region of the input image and wherein the processor is arranged to compute second statistics describing the sub-region of the input image and to fit a second multi-modal model to those second statistics.

7. An image mapping system as claimed in claim 6 wherein the processor is also arranged to determine a second multi-modal tone-mapping function using the second multi-modal model.

8. An image mapping system as claimed in claim 7 wherein the tone-mapping processor is arranged to apply the second tone-mapping function to the image sub-region.

9. An image mapping system as claimed in claim 1 which further comprises an image compression device arranged to take the output image as input.

10. An image mapping system as claimed in claim 1 which is arranged to operate on images of bit-depth greater than 8 bits per pixel.

11. An image mapping system as claimed in claim 1 which is arranged to operate on medical images.

12. An image mapping system as claimed in claim 1 wherein the tone-mapping processor is also arranged to reverse the tone-mapping process in order to obtain the input image from the output image and the tone-mapping function without substantial loss of information in the input image.

13. A medical image mapping system comprising:
    an input arranged to receive at least part of an input image of a first bit-depth;
    a processor arranged to compute statistics describing the input image and to fit a multi-modal model to the statistics; the processor also being arranged to determine a multi-modal tone-mapping function comprising a plurality of sigmoid functions, one for each mode of the multi-modal model; and
    a tone-mapping processor arranged to apply the tone-mapping function to the received input image to form an output image of bit-depth different from the input image.

14. An image mapping system as claimed in claim 13 wherein the processor is arranged to compute a cumulative histogram of the input image.

15. A method of image mapping comprising:

receiving at an image processing system at least part of an input image of a first bit-depth;

computing statistics describing the input image using a processor;

fitting a multi-modal model to the statistics using the processor;

determining a multi-modal tone-mapping function from the multi-modal model using the processor, wherein the determining comprises determining a plurality of sigmoid functions, one for each mode of the multi-modal model; and applying the tone-mapping function to the received input image using a tone-mapping processor to form an output image of bit-depth different from the input image.

16. A method as claimed in claim 15 wherein the step of computing the statistics comprises computing a cumulative histogram of the input image.

17. A method as claimed in claim 16 wherein the step of fitting a multi-modal model comprises fitting an n-component Gaussian mixture model to the cumulative histogram.

18. A method as claimed in claim 15 wherein the step of fitting a multi-modal model comprises fitting a bi-modal model.

* * * * *